US009300726B2

(12) United States Patent
Ashok et al.

(10) Patent No.: US 9,300,726 B2
(45) Date of Patent: Mar. 29, 2016

(54) IMPLEMENTING A PRIVATE NETWORK ISOLATED FROM A USER NETWORK FOR VIRTUAL MACHINE DEPLOYMENT AND MIGRATION AND FOR MONITORING AND MANAGING THE CLOUD ENVIRONMENT

(71) Applicant: International Business Machines Corporation, Armonk, NY (US)

(72) Inventors: Rohith K. Ashok, Apex, NC (US); Roy F. Brabson, Raleigh, NC (US); Lap T. Huynh, Cary, NC (US); Michael S. Law, Morrisville, NC (US); Mickael Maison, Southampton (GB); Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 13/741,563

(22) Filed: Jan. 15, 2013

(65) Prior Publication Data

US 2014/0201365 A1 Jul. 17, 2014

(51) Int. Cl.
*G06F 15/173* (2006.01)
*H04L 29/08* (2006.01)
*H04L 12/46* (2006.01)
*H04L 12/725* (2013.01)
*H04L 29/06* (2006.01)

(52) U.S. Cl.
CPC ............ *H04L 67/10* (2013.01); *H04L 12/4641* (2013.01); *H04L 45/302* (2013.01); *H04L 65/80* (2013.01)

(58) Field of Classification Search
CPC .............. G06F 9/5083; G06F 9/45558; G06F 9/45504; G06F 3/0689; H04M 3/523; H04M 3/51; H04M 3/5232; H04M 3/5183; H04L 12/4641; H04L 12/6418
USPC .................................................. 709/225, 238
See application file for complete search history.

(56) References Cited

U.S. PATENT DOCUMENTS

| 7,908,395 | B1 | 3/2011 | Salkewicz |
| 8,005,983 | B2 * | 8/2011 | Hopen ................ G06F 21/6218 709/226 |
| 8,130,764 | B1 | 3/2012 | Salkewicz |
| 2011/0022695 | A1 | 1/2011 | Dalal et al. |
| 2011/0075664 | A1 | 3/2011 | Lambeth et al. |
| 2011/0142053 | A1 | 6/2011 | Van Der Merwe et al. |

(Continued)

OTHER PUBLICATIONS

Mell et al., "The NIST Definition of Cloud Computing," Special Publication 800-145, Sep. 2011.

*Primary Examiner* — Joseph E Avellino
*Assistant Examiner* — Patrick Ngankam
(74) *Attorney, Agent, or Firm* — Robert A. Voigt, Jr.; Winstead, P.C.

(57) ABSTRACT

A method, system and computer program product for optimizing quality of service settings for virtual machine deployment and migration. A first network (e.g., user network) is provided that is dedicated to running user workloads deployed on virtual machines. A second network (e.g., cloud management network), isolated from the first network, is also provided that is dedicated to virtual machine deployment and migration. As a result of the first and second networks not being shared, the administrative server utilizes unique quality of service settings for virtual machine deployment and migration supported by the second network that would otherwise not be possible if the first and second networks were shared.

20 Claims, 5 Drawing Sheets

(56) References Cited

U.S. PATENT DOCUMENTS

| | | | |
|---|---|---|---|
| 2011/0258481 A1* | 10/2011 | Kern | G06F 11/1484 714/4.1 |
| 2011/0283017 A1 | 11/2011 | Alkhatib et al. | |
| 2012/0102291 A1 | 4/2012 | Cherian et al. | |
| 2013/0007239 A1* | 1/2013 | Agarwal | H04L 63/02 709/223 |
| 2013/0297769 A1* | 11/2013 | Chang | G06F 9/45558 709/224 |

* cited by examiner

IMPLEMENTING A PRIVATE NETWORK ISOLATED FROM A USER NETWORK FOR VIRTUAL MACHINE DEPLOYMENT AND MIGRATION AND FOR MONITORING AND MANAGING THE CLOUD ENVIRONMENT

TECHNICAL FIELD

The present invention relates generally to cloud computing, and more particularly to implementing a private network isolated from a user network for virtual machine deployment and migration and for monitoring and managing the cloud environment thereby not requiring to coordinate the resources, input/output bandwidth and Internet Protocol (IP) addresses between the user and cloud management networks.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Currently, cloud computing environments include a cloud management network that is shared with a user network. The cloud management network is used to deploy and migrate (relocate) virtual machines among the cloud computing nodes as well as monitor and manage the cloud computing environment. A user via the user network may monitor and manage the hardware in the cloud computing environment as well as monitor and manage the software that has been deployed and running in the cloud computing environment. Since the user network is shared with the cloud management network, resources, input/output bandwidth and Internet Protocol (IP) addresses need to be coordinated among the networks.

However, by coordinating the resources, input/output bandwidth and IP addresses between the networks, the Quality of Service (QoS) settings cannot be optimized for the deployment and migration of the virtual machines using the cloud management network.

BRIEF SUMMARY

In one embodiment of the present invention, a method for optimizing quality of service settings for virtual machine deployment and migration comprises providing a first network dedicated to running user workloads deployed on virtual machines. The method further comprises providing a second network dedicated to virtual machine deployment and migration, where the second network is isolated from the first network. Additionally, the method comprises receiving a network access request with a network attribute. Furthermore, the method comprises identifying the network attribute. The method further comprises routing and processing the network access request on the first network in response to the network attribute being identified as a user workload. In addition, the method comprises routing and processing, by a processor, the network access request on the second network in response to the network attribute being identified as the virtual machine deployment and migration.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for optimizing quality of service settings for virtual machine deployment and migration. In one embodiment of the present invention, a first network (e.g., user network) is provided that is dedicated to running user workloads deployed on virtual machines. A second network (e.g., cloud management network), isolated from the first network, is also provided that is dedicated to virtual machine deployment and migration. An administrative server receives a network access request with a network attribute, where the network attribute relates to running user workloads on the first network or deploying and migrating virtual machines on the second network. If the network attribute is identified as a user workload, then the administrative server routes and processes the network access request on the first network. If, however, the network attribute is identified as virtual machine deployment and migration, then the administrative server routes and processes the network access request on the second network. As a result of the first and second networks not being shared, the coordination of resources, input/output bandwidth and IP addresses between the first and second networks is no longer required. By no longer requiring the coordination of resources, input/output bandwidth and IP addresses between the first and second networks, administrative server utilizes unique quality of service settings (i.e., the quality of service settings can be optimized) for virtual machine deployment and migration supported by the second network that would otherwise not be possible if the first and second networks were shared.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
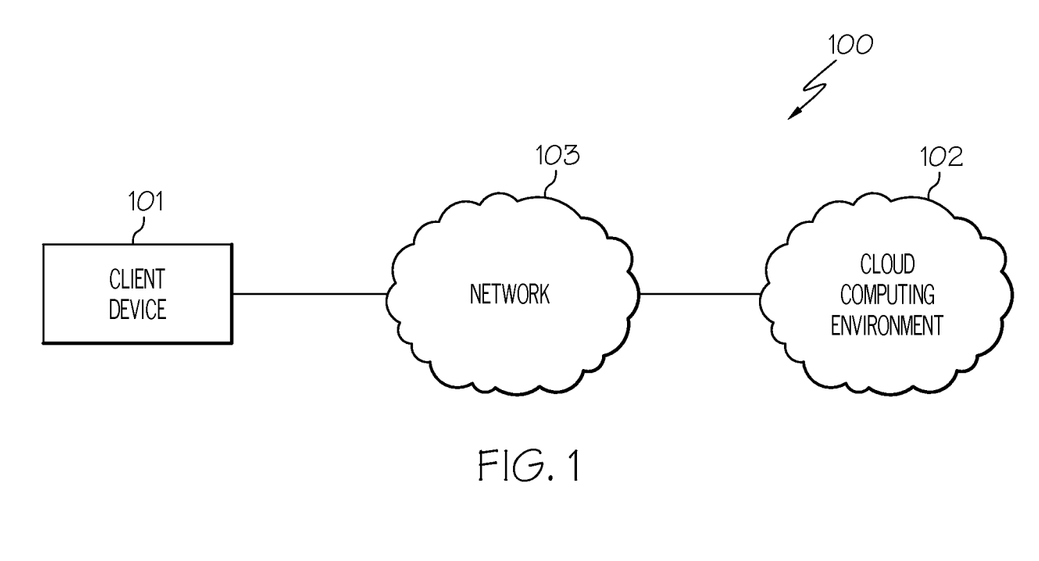
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
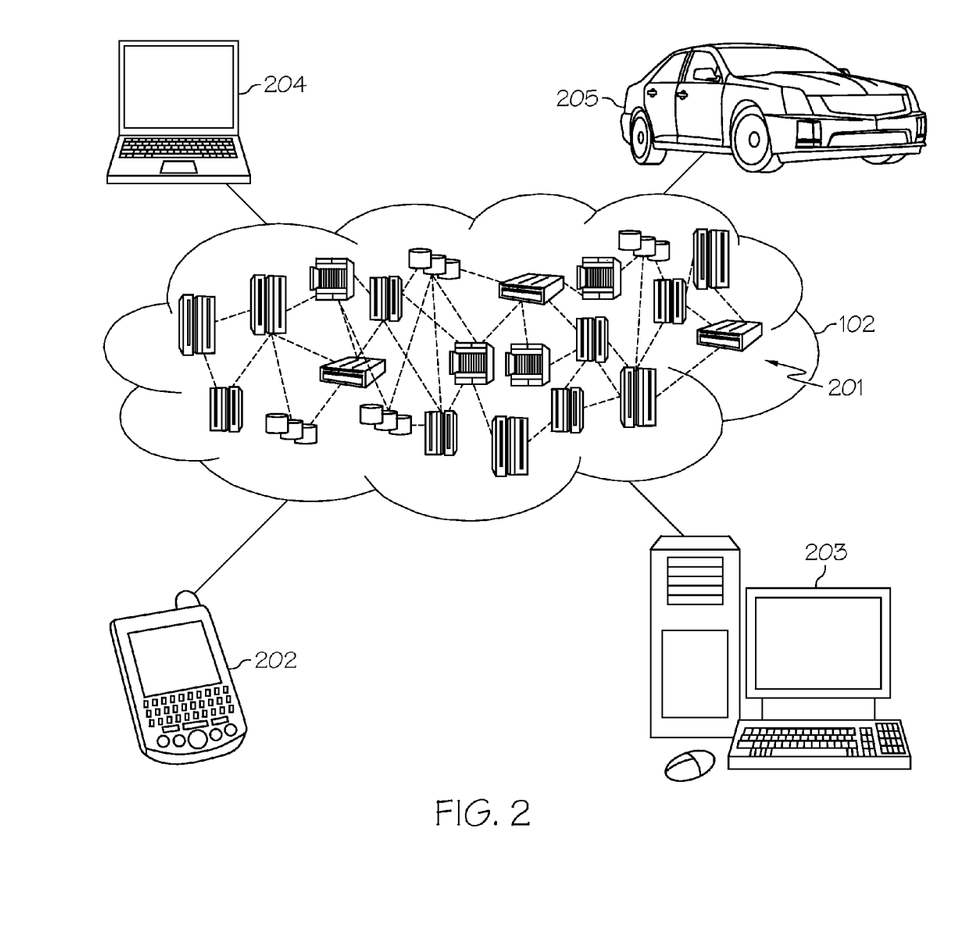
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of exemplary cloud computing nodes 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
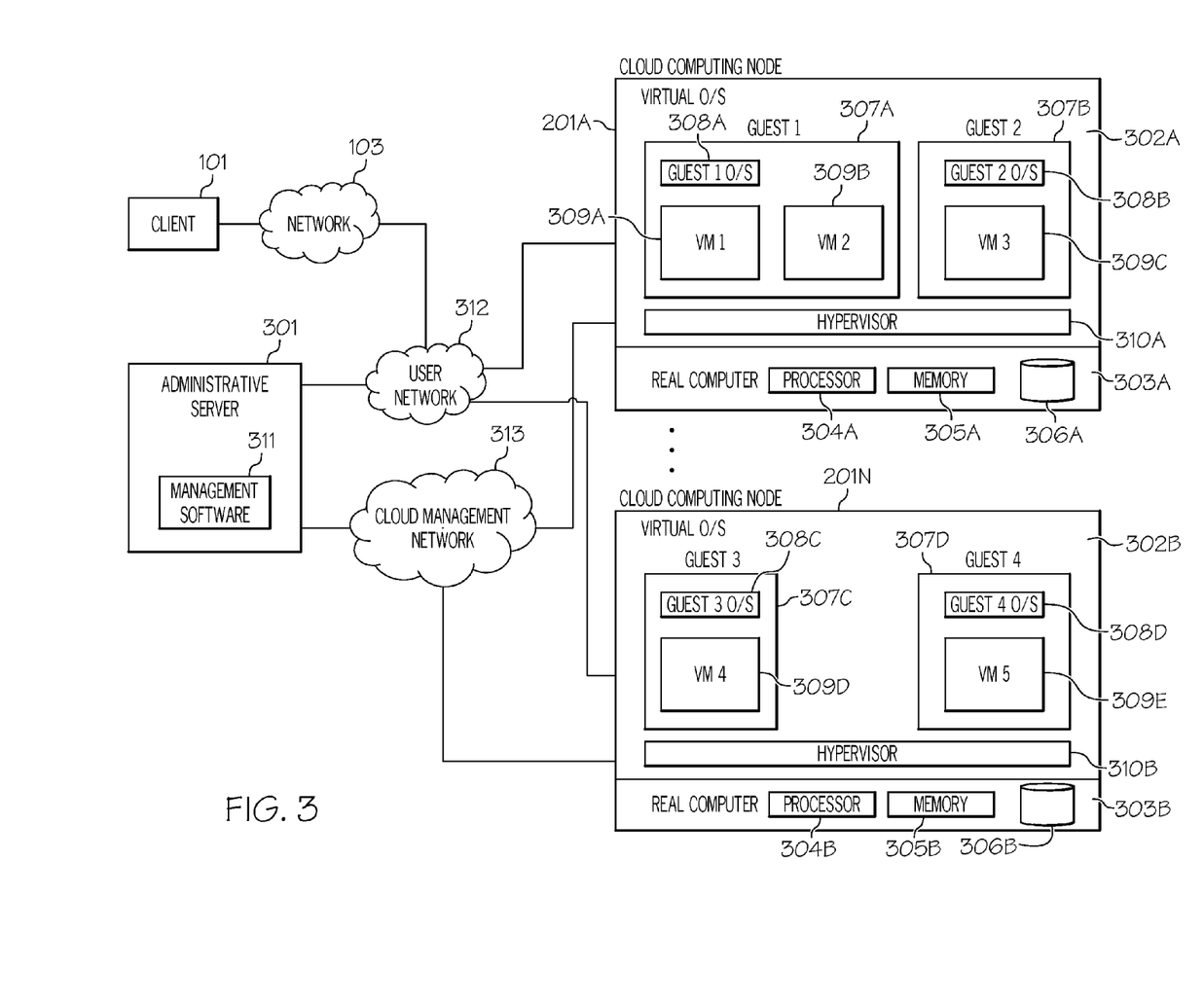
FIG. 3 illustrates a schematic of exemplary cloud computing nodes in a virtualized computer environment interconnected with an administrative server via a user network and a cloud management network in accordance with an embodiment of the present invention.

Referring now to FIG. 3, FIG. 3 illustrates cloud computing nodes 201A-N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 via a user network 312 and a private network, referred to herein as the "cloud management network" 313. Administrative server 301 is configured to provide data center-level functions of communicating with hypervisors on cloud computing nodes 201 to install virtual machines, terminate/suspend virtual machines and relocate virtual machines from one cloud computing node 201 to another within the data center. A description of the hardware configuration of administrative server 301 is provided further below in connection with FIG. 4.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1" and "Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3" and "Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 311, that can be used to manage all the hardware components of cloud computing nodes 201, monitor utilization of resources (e.g., memory, processor, disk, network) by virtual machines 309, intelligently deploy images of data and optimize the operations of cloud computing environment 102. Furthermore, management software 311 is configured to optimize the quality of service settings for virtual machine 309 deployment and migration utilizing separate physical networks 312, 313 as discussed below in connection with FIG. 5.

As stated above, administrative server 301 is coupled to cloud computing nodes 201 via a user network 312 and a cloud management network 313. In one embodiment, user network 312 is dedicated to running user workloads deployed on virtual machines 309. In one embodiment, user network 312 is accessible by client 101 (FIG. 1) via an outside network 103 (FIG. 1).

In one embodiment, cloud management network 313 is a private network that uses private Internet Protocol (IP) space. Furthermore, cloud management network 313 is isolated from user network 312 as well as not connected to an external network. In one embodiment, cloud management network 313 is self-configuring. In one embodiment, cloud management network 313 utilizes a set of physical hardware adapters that is separate from those used on other networks. In one embodiment, cloud management network 313 is dedicated to virtual machine 309 deployment and migration as well as dedicated to monitoring and managing cloud computing environment 102 (FIGS. 1 and 2). Furthermore, in one embodiment, cloud management network 313 is not directly accessible by users; however, cloud management network 313 is used for tasks initiated by authorized users. In one embodiment, users are authenticated by management software 311 to verify they are permitted to access services over cloud management network 313. Any service that the user accesses may also verify that the user is authorized to access that specific service.

As a result of providing two separate physical networks, user network 312 and cloud management network 313, where user network 312 is utilized by workloads running on virtual machines 309 and cloud management network 313 is used for virtual machine 309 deployment and migration as well as monitoring and managing of cloud computing environment 102, the coordination of resources, input/output bandwidth and IP addresses between user network 312 and cloud management network 313 is no longer required. By no longer requiring the coordination of the resources, input/output bandwidth and IP addresses between user network 312 and cloud management network 313, unique quality of service settings can be utilized (i.e., the quality of service settings can be optimized) for virtual machine 309 deployment and migration that would otherwise not be possible if the network infrastructure was shared with user network 312. In one embodiment, cloud management network 313 utilizes jumbo frames (Ethernet frames with more than 1500 bytes of payload) for virtual machine 309 deployment and migration. Traffic that requires low latency, such as management requests initiated by an end-user, utilizes a different Differentiated Services (DiffServ) code point to ensure that the bulk virtual machine 309 migrations/relocations do not have an impact on the latency observed by the user.

Figure 4:
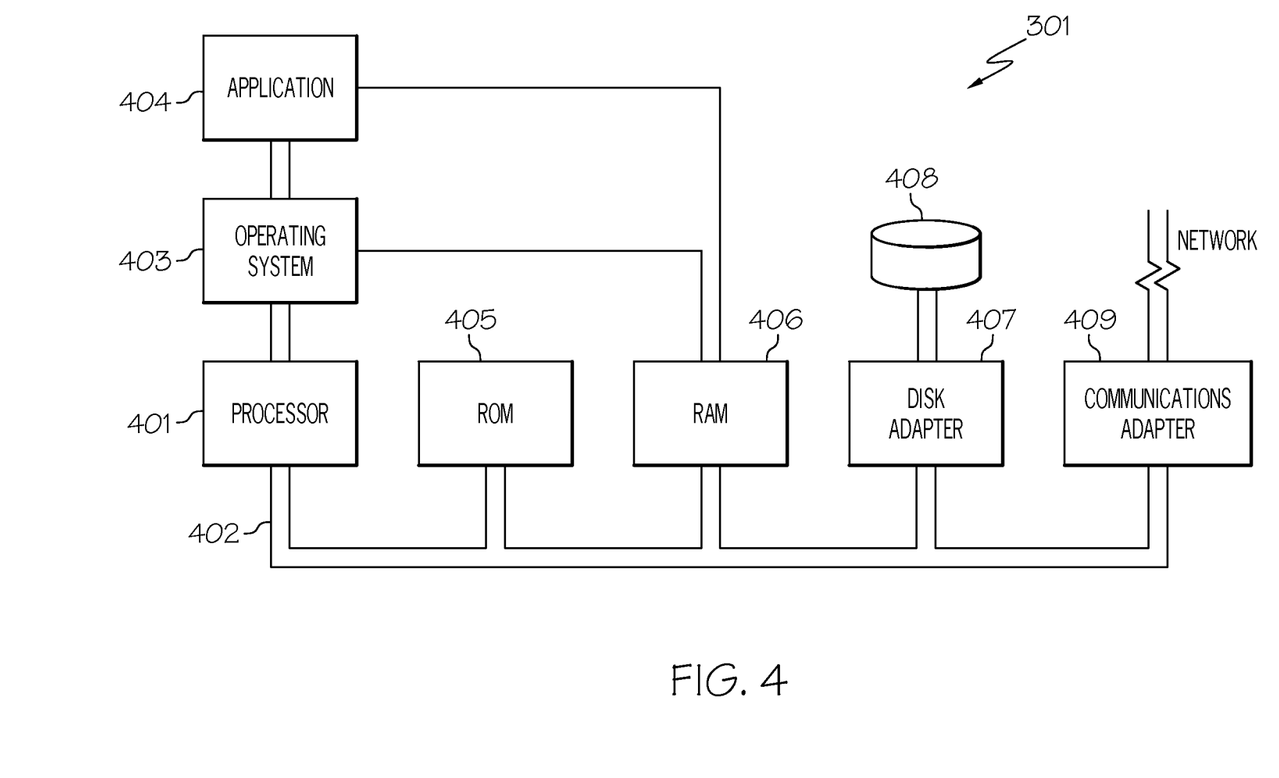
FIG. 4 illustrates a hardware configuration of an administrative server configured in accordance with an embodiment of the present invention.

Referring now to FIG. 4, FIG. 4 illustrates a hardware configuration of administrative server 301 (FIG. 4) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 311) for optimizing the quality of service settings for virtual machine 309 (FIG. 3) deployment and migration utilizing separate physical networks 312, 313 (FIG. 3) as discussed further below in association with FIG. 5.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for optimizing the quality of service settings for virtual machine 309 deployment and migration utilizing separate physical networks 312, 313, as discussed further below in association with FIG. 5, may reside in disk unit 408 or in application 404.

Administrative server 301 may further include a communications adapter 409 coupled to bus 402. Communications adapter 409 interconnects bus 402 with a network (e.g., network 103 of FIG. 1, networks 312, 313).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, cloud computing environments include a cloud management network that is shared with a user network. The cloud management network is used to deploy and migrate (relocate) virtual machines among the cloud computing nodes as well as monitor and manage the cloud computing environment. A user via the user network may monitor and manage the hardware in the cloud computing environment as well as monitor and manage the software that has been deployed and running in the cloud computing environment. Since the user network is shared with the cloud management network, resources, input/output bandwidth and Internet Protocol (IP) addresses need to be coordinated among the networks. However, by coordinating the resources, input/output bandwidth and IP addresses between the networks, the Quality of Service (QoS) settings cannot be optimized for the deployment and migration of the virtual machines using the cloud management network.

The principles of the present invention provide a means for optimizing QoS settings for the deployment and migration of virtual machines 309 (FIG. 3) using cloud management network 313 (FIG. 3) by utilizing separate physical networks. One of the physical networks is user network 312 (FIG. 3) which is utilized for running workloads deployed on virtual machines 309. The other physical network is cloud management network 313 (FIG. 3) which is utilized for virtual machine 309 deployment and migration as well as for monitoring and managing cloud computing environment 102. Since cloud management network 313 is isolated from user network 312 and cannot be accessed directly by the end-user, the coordination of resources, input/output bandwidth and IP addresses between user network 312 and cloud management network 313 is no longer required thereby allowing quality of service settings to be optimized for virtual machine 309 deployment and migration that would otherwise not be possible if the network infrastructure was shared with user network 312. A description of a method for optimizing quality of service settings for virtual machine 309 deployment and migration utilizing such an architecture is described below in connection with FIG. 5.

Figure 5:
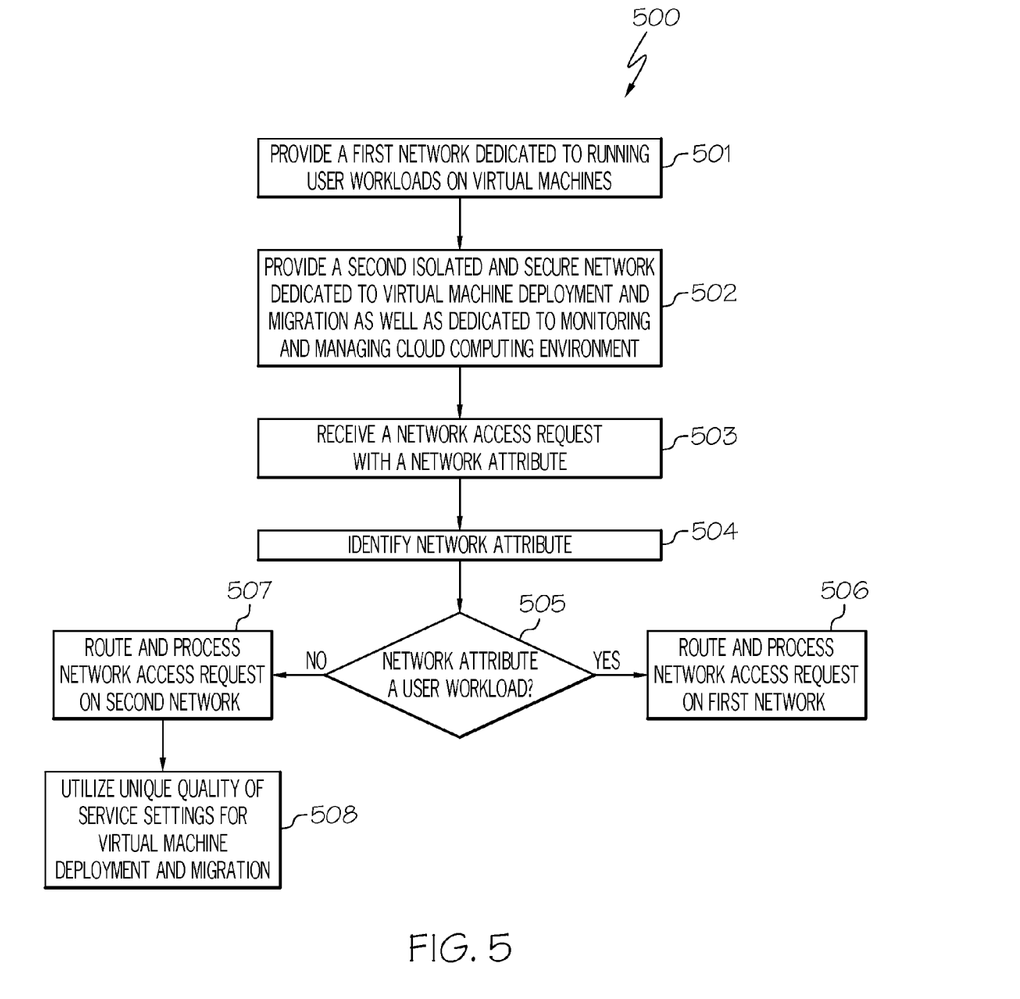
FIG. 5 is a flowchart of a method for optimizing quality of service settings for virtual machine deployment and migration in accordance with an embodiment of the present invention.

FIG. 5 is a flowchart of a method 500 for optimizing quality of service settings for virtual machine 309 deployment and migration in accordance with an embodiment of the present invention.

Referring to FIG. 5, in conjunction with FIGS. 1-4, in step 501, management software 311 provides a first network, such as user network 312, dedicated to running user workloads deployed on virtual machines 309.

In step 502, management software 311 provides a second network, such as cloud management network 313, dedicated to virtual machine 309 deployment and migration as well as dedicated to monitoring and managing cloud computing environment 102. As discussed above, cloud management network 313 is a private network that is isolated from user network 312. As a result, the coordination of resources, input/output bandwidth and IP addresses between user network 312 and cloud management network 313 is no longer required. By no longer requiring the coordination of the resources, input/output bandwidth and IP addresses between user network 312 and cloud management network 313, unique quality of service settings can be utilized (i.e., the quality of service settings can be optimized) for virtual machine 309 deployment and migration that would otherwise not be possible if the network infrastructure was shared with user network 312.

In step 503, management software 311 receives a network access request with a network attribute, such as from client 101. A network attribute, as used herein, refers to an attribute of the request that relates to running user workloads on user network 312 or relates to deploying or migrating virtual machines 309 or to monitoring or managing cloud computing environment 102 on cloud management network 313.

In step 504, management software 311 identifies the network attribute. For example, management software 311 identifies the network attribute from the received network access request being a user workload. In another example, management software 311 identifies the network attribute from the received network access request being a virtual machine 309 deployment and migration.

In step 505, a determination is made by management software 311 as to whether the network attribute is a user workload. If the network attribute is identified as a user workload, then, in step 506, management software 311 routes and processes the network access request on the first network, such as user network 312.

If, however, the network attribute is not identified as a user workload but is instead identified as virtual machine 309 deployment and migration, then, in step 507, management software 311 routes and processes the network access request on the second network, such as cloud management network 313. In step 508, management software 311 utilizes unique quality of service settings (i.e., the quality of service settings can be optimized) for virtual machine 309 deployment and migration supported by cloud management network 313 that would otherwise not be possible if user network 312 and cloud management network 313 were shared.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing quality of service settings for virtual machine deployment and migration, the method comprising:
providing a first network dedicated to running user workloads deployed on virtual machines;
providing a second network dedicated to virtual machine deployment and migration, wherein said second network is isolated from said first network and cannot be accessed directly by an end-user via said first network;
receiving a network access request at an administrative server from a client, wherein said administrative server acts as an access point to analyze said request to identify said first network or said second network to process said network access request, wherein said network access request comprises a network attribute;
identifying, by a management software of said administrative server, said first network or said second network to process said network access request by analyzing said network attribute;
routing and processing said network access request on said first network in response to said network attribute being identified as a user workload; and
routing and processing, by a processor, said network access request on said second network in response to said network attribute being identified as said virtual machine deployment and migration.

2. The method as recited in claim 1 further comprising:
utilizing quality of service settings for said virtual machine deployment and migration supported by said second network.

3. The method as recited in claim 1, wherein said second network is dedicated to monitoring and managing a cloud computing environment.

4. The method as recited in claim 1, wherein said second network is a private network that uses private Internet Protocol (IP) address space.

5. The method as recited in claim 1, wherein said second network is self-configuring.

6. The method as recited in claim 1, wherein said second network is used for tasks initiated by authorized users, wherein said second network is not directly accessed by said authorized users.

7. The method as recited in claim 1, wherein said second network utilizes a set of physical hardware adapters that is separate from those used on other networks.

8. A computer program product embodied in a non-transitory computer readable storage medium for optimizing quality of service settings for virtual machine deployment and migration, the computer program product comprising the programming instructions for:
providing a first network dedicated to running user workloads deployed on virtual machines;
providing a second network dedicated to virtual machine deployment and migration, wherein said second network is isolated from said first network and cannot be accessed directly by an end-user via said first network;
receiving a network access request at an administrative server from a client, wherein said administrative server acts as an access point to analyze said request to identify said first network or said second network to process said network access request, wherein said network access request comprises with a network attribute;
identifying, by a management software of said administrative server, said first network or said second network to process said network access request by analyzing said network attribute;
routing and processing said network access request on said first network in response to said network attribute being identified as a user workload; and
routing and processing said network access request on said second network in response to said network attribute being identified as said virtual machine deployment and migration.

9. The computer program product as recited in claim 8 further comprising the programming instructions for:
utilizing quality of service settings for said virtual machine deployment and migration supported by said second network.

10. The computer program product as recited in claim 8, wherein said second network is dedicated to monitoring and managing a cloud computing environment.

11. The computer program product as recited in claim 8, wherein said second network is a private network that uses private Internet Protocol (IP) address space.

12. The computer program product as recited in claim 8, wherein said second network is self-configuring.

13. The computer program product as recited in claim 8, wherein said second network is used for tasks initiated by authorized users, wherein said second network is not directly accessed by said authorized users.

14. The computer program product as recited in claim 8, wherein said second network utilizes a set of physical hardware adapters that is separate from those used on other networks.

15. A system, comprising:
   a memory unit for storing a computer program for optimizing quality of service settings for virtual machine deployment and migration; and
   a processor coupled to said memory unit, wherein said processor, responsive to said computer program, comprises:
      circuitry for providing a first network dedicated to running user workloads deployed on virtual machines;
      circuitry for providing a second network dedicated to virtual machine deployment and migration, wherein said second network is isolated from said first network and cannot be accessed directly by an end-user via said first network;
      circuitry for receiving a network access request at an administrative server from a client, wherein said administrative server acts as an access point to analyze said request to identify said first network or said second network to process said network access request, wherein said network access request comprises with a network attribute;
      circuitry for identifying, by a management software of said administrative server, said first network or said second network to process said network access request by analyzing said network attribute;
      circuitry for routing and processing said network access request on said first network in response to said network attribute being identified as a user workload; and
      circuitry for routing and processing said network access request on said second network in response to said network attribute being identified as said virtual machine deployment and migration.

16. The system as recited in claim 15, wherein said processor further comprises:
   circuitry for utilizing quality of service settings for said virtual machine deployment and migration supported by said second network.

17. The system as recited in claim 15, wherein said second network is dedicated to monitoring and managing a cloud computing environment.

18. The system as recited in claim 15, wherein said second network is a private network that uses private Internet Protocol (IP) address space.

19. The system as recited in claim 15, wherein said second network is self-configuring.

20. The system as recited in claim 15, wherein said second network is used for tasks initiated by authorized users, wherein said second network is not directly accessed by said authorized users.

* * * * *